United States Patent [19]

Gliddon

[11] Patent Number: 5,841,531
[45] Date of Patent: *Nov. 24, 1998

[54] SPECTROMETER WITH DISCHARGE LIMITING MEANS

[75] Inventor: Craig William Gliddon, Dandenong, Australia

[73] Assignee: Varian Associates, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 849,943

[22] PCT Filed: Dec. 19, 1995

[86] PCT No.: PCT/AU95/00856

§ 371 Date: Jun. 20, 1997

§ 102(e) Date: Jun. 20, 1997

[87] PCT Pub. No.: WO96/19716

PCT Pub. Date: Jun. 27, 1996

[30] Foreign Application Priority Data

Dec. 20, 1994 [AU] Australia .................................. PN0152
Jan. 11, 1995 [AU] Australia .................................. PN0478

[51] Int. Cl.⁶ .............................. G01N 21/68; G01J 3/433
[52] U.S. Cl. ........................................................... 356/316
[58] Field of Search .............................. 350/316; 250/288

[56] References Cited

U.S. PATENT DOCUMENTS 5,334,834  8/1994  Ito et al. .................................. 250/288
5,367,163  11/1994  Otsuka et al. .......................... 250/288

FOREIGN PATENT DOCUMENTS 0 252 475 A2  1/1988  European Pat. Off. .

*Primary Examiner*—F. L. Evans
*Attorney, Agent, or Firm*—Edward Berkowitz

[57] ABSTRACT

An inductively coupled plasma spectrometer including shielding/sampling means (1) located between a plasma torch (3) and an optical system (4) of the spectrometer, wherein said shielding/sampling (1) means is associated with an enclosure (9) for the plasma torch such that a relatively high independance path (10, 11) is established for limiting flow of electrical current between said shielding/sampling means (1) and said enclosure (9).

15 Claims, 1 Drawing Sheet

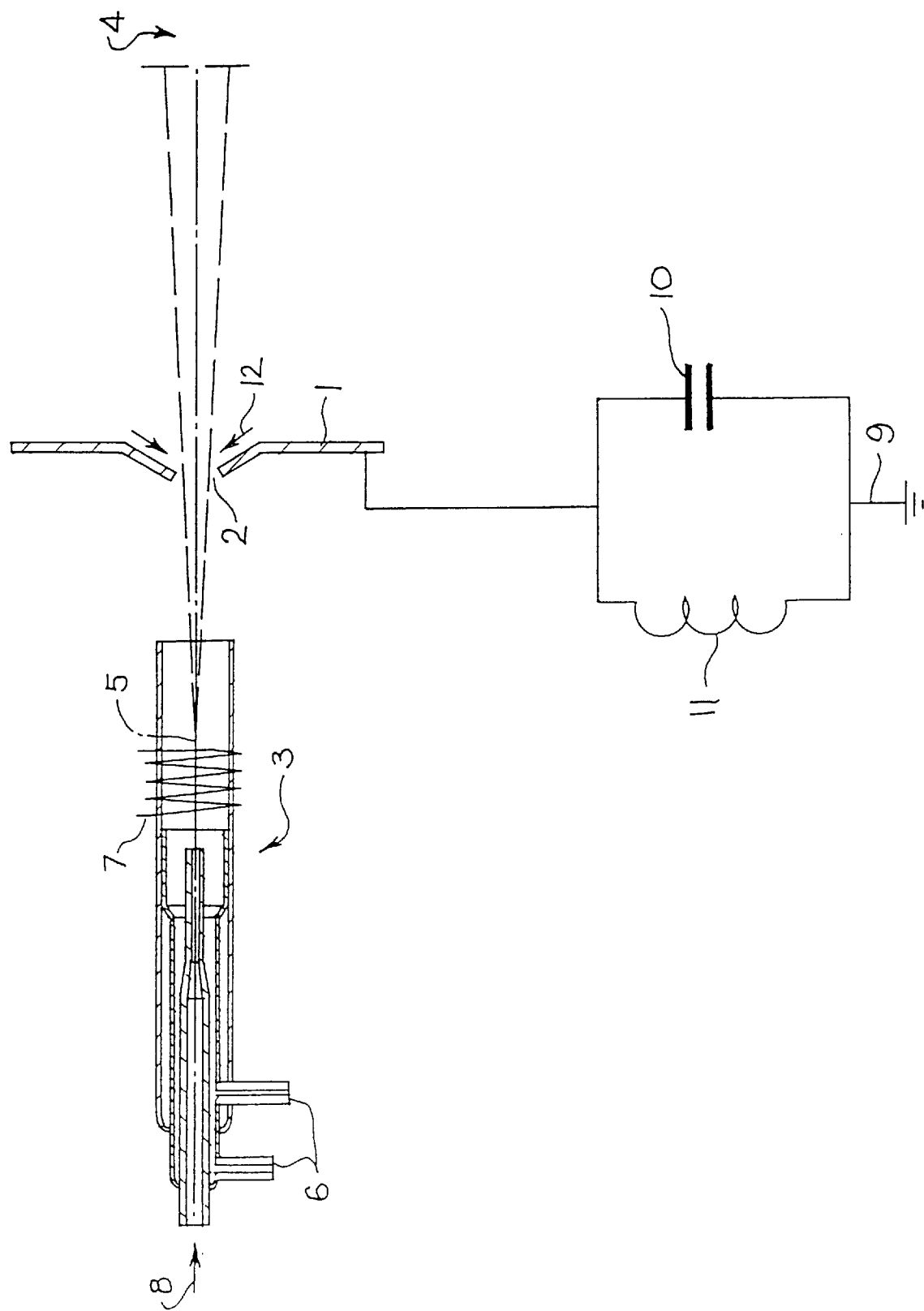

SPECTROMETER WITH DISCHARGE LIMITING MEANS

This invention relates to an inductively coupled plasma spectrometer. The invention is advantageously applied to an optical emission spectrometer (ICP-OES) wherein the plasma torch and the optical system of the spectrometer may be axially aligned and will be described herein in that context. Nevertheless it is to be appreciated that it is not thereby limited to such applications.

In emission spectrometers of the above type, radio frequency (RF) energy is inductively coupled into a gas, such as for example argon, which is caused to flow through the torch to generate a plasma discharge. The plasma is used to atomise and excite a sample that is injected into the plasma to cause the emission of light at wave lengths which are characteristic of the atomic composition of the sample. The emitted light is detected and measured to obtain an analysis of the sample.

Analytical detection limits are improved in optical emission spectrometers in which the cloud of excited atoms generated in the plasma is viewed by an optical detection system of the spectrometer axially along the central axis of the plasma torch rather than perpendicular to that axis as in some known instruments. However an axially aligned optical system needs to be protected from the heat and contaminants in the plasma exhaust. This may be done by interposing a shield that includes a sampling or viewing port or orifice between the plasma "tail" and the entrance end of the optical system. Such a shield is best if made of a conductive metal, as this allows it to be adapted, for example by the incorporation of a cooling system, to minimise damage which may be caused to the shield or its insulating support structure by heat from the plasma or hot gases leaving the plasma.

In inductively coupled plasma spectrometers the plasma acquires a radio frequency potential because of capacitive coupling between the induction coil and the plasma. This potential can cause an electrical discharge to occur from the plasma to the sampling shield, the possibility of which is increased if the shield is made of a conductive metal.

An object of the present invention is to provide an inductively coupled plasma spectrometer in which the problem of an electrical discharge occurring between the plasma and the sampling shield is eliminated or at least substantially ameliorated.

A similar discharge problem can occur between the plasma and a cone containing a sampling orifice in inductively coupled plasma mass spectrometers (ICP-MS). The problem may be addressed in ICP mass spectrometers by reducing the potential difference between the plasma and the sampling cone, for example by special induction coil arrangements as in U.S. Pat. Nos. 5,194,731 and 4,501,965 (RE 33386) or by biasing the cone as in U.S. Pat. No. 4,682,026. However, these are relatively costly solutions which may be commercially viable for ICP mass spectrometers in circumstances where the arcing problem is especially critical in these spectrometers. In other circumstances the present invention may offer a solution to the problem of arcing which is realisable in a simple and cost effective manner in ICP-OES as well as in ICP-MS instruments.

Accordingly, the invention provides an inductively coupled plasma spectrometer including shielding/sampling means located between a plasma torch and an optical system of the spectrometer, wherein said shielding/sampling means is associated with an enclosure for the plasma torch such that a relatively high impedance path is established for limiting flow of electrical current between said shielding/sampling means and said enclosure.

Flow of electrical current between the shielding/sampling means should be limited below a level which would sustain a discharge.

It has been shown that isolating the shielding/sampling means from the enclosure by an insulating medium does not provide the requisite high impedance as reactance of the capacitance between the shielding/sampling means and the enclosure at the frequency of the plasma RF source is typically too low.

Preferably the high impedance path includes a circuit that is resonant at the frequency of the RF supplied to the induction coil of the plasma torch. More preferably the circuit includes an inductance chosen such that it and the capacitance between the shielding/sampling means and the plasma system enclosure will form a parallel resonant circuit at the frequency of the RF supply. The circuit may also include a variable inductor or capacitor, for example a trimming capacitor, for tuning the circuit. Preferably the inductance includes an air-cored inductor.

In a preferred embodiment of the present invention, the circuit for establishing a high impedance path between the shielding/sampling means and plasma system enclosure is provided by an air-cored inductor which is also used to supply a coolant to the shielding/sampling means. In this embodiment, the inductor is formed from hollow conductive tubing, for example of silver plated copper, through which a coolant such as for example water is supplied for circulation through ducting in or associated with the shielding/sampling means before it passes out of the system via a suitable outlet.

A parallel resonant circuit as provided by the invention has a high impedance at the resonant frequency which is given by the product of the inductive reactance of the inductor and the quality factor (Q) of the tuned circuit. For example, at a frequency of between 27 to 100 MHz, which is a typical for the RF supply to the induction coil of the plasma torch, a Q in excess of 400 may be readily realised. This may establish a high impedance at the resonant frequency such as may substantially reduce a discharge current from the plasma in comparison to a spectrometer not having the parallel resonant circuit.

A preferred embodiment of the present invention will now be described, by way of example only, with reference to the accompanying drawing. The drawing is a schematic diagram showing the physical location and electrical connection of a shielding/sampling cone 1 within an inductively coupled plasma optical emission spectrometer according to an embodiment of the present invention.

The invention, as exemplified in the drawing, includes a conductive metal cone 1 having a viewing aperture 2, interposed between a plasma torch 3 and an optical system 4. The torch 3, cone aperture 2 and optical system 4 are aligned such that a cloud of excited atoms from a sample, as generated in the plasma torch, is viewed axially along the central axis 5 of the torch rather than perpendicularly to that axis as in conventional systems. This axial viewing arrangement improves analytical detection limits of ICP-OES instruments because emissions from the excited atoms are viewed more efficiently than is the case if a side view is taken. The optical viewing system and associated detection and analytical componentry and circuits as such are generally the same in the axial system as in the conventional perpendicular viewing system. Such systems, componentry and circuits are known in the art and are thus not described in detail herein.

Plasma torch 3 includes inlets 6 for supplying a plasma forming gas, which is preferably argon; and an induction coil 7 for inductively coupling RF energy, preferably at a free running frequency of 40 Mhz (nominal), into the gas flowing through the torch to generate a plasma. A suitable RF supply (not shown) is connected to induction coil 7. A sample may be injected axially through an inlet 8 into the torch for atomisation in the plasma.

In operation of the torch the plasma acquires a potential from the induction coil 7 and capacitive coupling will occur between the cone 1 and an enclosure for the plasma system, which enclosure is represented by the ground connection shown at 9. This capacitive coupling is represented by the capacitor referenced as 10. In accordance with the invention, an air-cored inductor 11 is also connected between the cone 1 and enclosure 9, its inductance being such that it forms a parallel resonant circuit with capacitor 10 at the frequency of the RF supply to induction coil 7. The parallel resonant circuit 10–11 provides a relatively high impedance path between cone 1 and enclosure 9 which acts to suppress or limit flow of electrical current from the plasma such that a discharge to cone 1 is avoided.

A variable capacitor (not shown) may be connected across the inductor 11 (in which case it may be in parallel with capacitor 10 or may replace capacitor 10) for adjusting the total capacitance to allow the circuit to be tuned to resonance. Alternatively or additionally inductor 11 may be constructed such that its inductance is adjustable for tuning purposes. In one embodiment this may be achieved by deforming the hollow tubing from which the inductor is formed. A preferred construction may be to manufacture inductor 11 to provide the correct inductance to resonate with capacitor 10 at the plasma torch operating frequency.

Cone 1 is preferably made of metal, for example nickel, and is in heat conducting relationship with a heat sink (not shown) for extracting heat from the cone. The heat sink may include a duct for passage of a coolant, preferably water, therethrough. Conveniently, the tubing for supply of the coolant to the heat sink associated with cone 1 may be coiled so as to form inductor 11. Thus the invention offers a simple and cost effective means for suppressing arcing to the cone in that two functions may be served by one component.

A supply of argon gas may be directed to pass out of aperture 2 in cone 1, as indicated by arrows 12, to give added protection for the optical system 4 from the plasma exhaust.

It has been found that for a Varian Liberty Model 150 AX ICP-OES instrument, an inductor 11 needs to have an inductance of about 440 nH for realisation of the invention. This may be formed by suitably coiling a coolant inlet tube of for example silver plated copper and of about 4 mm OD. In other instruments the inductance may range in value from about 60 to 700 nH.

To facilitate ignition of the plasma, it may be necessary to provide means by which the resonant circuit can be detuned from the frequency of the plasma RF source or alternatively the quality factor (Q) of the tuned circuit may be decreased. For example the frequency of the resonant circuit may be detuned so that it lies above or below the frequency of the RF source. Depending on the quality factor of the tuned circuit, this may have the effect of reducing substantially the value of the high impedance path between cone 1 and enclosure 9. The resonant frequency can be decreased by switching additional tuning capacitance across inductor 11 to lower the resonant frequency. The value of the high impedance path between shielding/sampling cone 1 and enclosure 9 may alternatively be reduced by reducing the quality factor of the tuned circuit. The quality factor may be reduced by reducing the value of inductor 11 or by increasing the resistance of the resonant circuit. The latter may be achieved by switching a suitable resistance across inductor 11, by temporarily connecting cone 1 to enclosure 9 or by providing another inductor mutually coupled to an inductor forming part of the cone resonant circuit which can be short circuited by an appropriate switch.

The invention described herein is susceptible to variations, modifications and/or additions other than those specifically described and it is to be understood that the invention includes all such variations, modifications and/or additions which fall within the spirit and scope of the above description.

I claim:

1. An inductively coupled plasma spectrometer including shielding/sampling means located between a plasma torch having an enclosure and an optical system of the spectrometer, said shielding/sampling means being connected with said enclosure surrounding the plasma torch such that a relatively high impedance path is established for limiting flow of electrical current between said shielding/sampling means and said enclosure as compared with the flow of electrical current from said enclosure if directly connected to said shielding/sampling means.

2. An inductively coupled plasma spectrometer according to claim 1 wherein said plasma torch is supplied with an RF frequency and said path includes a resonant circuit, said resonant circuit resonant at or near the said RF frequency.

3. An inductively coupled plasma spectrometer according to claim 2 wherein said frequency is in the range of 27 to 100 Mhz.

4. An inductively coupled plasma spectrometer according to claim 2 wherein said resonant circuit includes an inductance and a capacitance.

5. An inductively coupled plasma spectrometer according to claim 4 wherein said inductance includes an air cored inductor.

6. An inductively coupled plasma spectrometer according to claim 4 wherein said inductance and capacitance between said shielding/sampling means and said enclosure form a parallel resonant circuit at said frequency.

7. An inductively coupled plasma spectrometer according to claim 2 wherein said resonant circuit includes a variable capacitor for tuning said resonant circuit.

8. An inductively coupled plasma spectrometer according to claim 2 wherein said resonant circuit includes a variable inductor for tuning said circuit.

9. An inductively coupled plasma spectrometer according to claim 4 wherein said inductance is hollow for passing a coolant to said shielding/sampling means.

10. An inductively coupled spectrometer according to claim 2 wherein the quality factor (Q) of said circuit is at least 400.

11. An inductively coupled plasma spectrometer according to claim 10 including means for reducing said quality factor to facilitate ignition of said plasma torch.

12. An inductively coupled plasma spectrometer according to claim 10 including means for detuning said resonant circuit during ignition of said plasma torch.

13. An inductively coupled plasma spectrometer according to claim 4 wherein said inductance has a value of substantially between 60 to 700 nH.

14. An inductively coupled plasma spectrometer according to claim 1 wherein said shielding/sampling means includes a sampling orifice/port.

15. An inductively coupled plasma spectrometer according to claim 1 wherein said spectrometer is an optical emission spectrometer.

* * * * *